(12) United States Patent
Friend et al.

(10) Patent No.: US 10,384,882 B2
(45) Date of Patent: Aug. 20, 2019

(54) MATERIAL MANAGEMENT SYSTEM AND METHOD FOR AN IN-PIT CRUSHER AND CONVEYER

(71) Applicant: Caterpillar Inc., Peoria, IL (US)

(72) Inventors: Paul Friend, Morton, IL (US);
Kenneth L. Stratton, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 203 days.

(21) Appl. No.: 15/387,057

(22) Filed: Dec. 21, 2016

(65) Prior Publication Data

US 2018/0170685 A1 Jun. 21, 2018

(51) Int. Cl.
| B65G 47/19 | (2006.01) |
| B65G 37/00 | (2006.01) |
| G06Q 50/02 | (2012.01) |
| G06Q 50/28 | (2012.01) |

(52) U.S. Cl.
CPC ............. *B65G 47/19* (2013.01); *B65G 37/00* (2013.01); *G06Q 50/02* (2013.01); *G06Q 50/28* (2013.01); *B65G 2201/045* (2013.01); *B65G 2203/0283* (2013.01); *B65G 2203/0291* (2013.01); *B65G 2203/04* (2013.01)

(58) Field of Classification Search
USPC ....................................................... 700/218
See application file for complete search history.

(56) References Cited

U.S. PATENT DOCUMENTS

| 5,234,094 | A | * | 8/1993 | Weyermann | B65G 65/28 198/303 |
| 5,377,810 | A | * | 1/1995 | Lehtonen | B65G 21/14 198/303 |
| 6,185,847 | B1 | * | 2/2001 | Russell | E02F 3/20 198/588 |
| 6,782,993 | B2 | * | 8/2004 | Bernard | B65G 41/008 198/300 |
| 7,013,937 | B2 | * | 3/2006 | Potts | B65G 53/30 137/355.17 |
| 8,276,736 | B2 | * | 10/2012 | Steele | B65G 41/008 198/303 |
| 8,387,779 | B2 | * | 3/2013 | Schroder | E21C 41/32 198/508 |
| 8,434,706 | B2 | * | 5/2013 | Davis | B02C 21/026 198/313 |
| 9,096,389 | B2 | | 8/2015 | Neilson et al. | |
| 9,580,874 | B2 | * | 2/2017 | Millsaps, II | B60P 1/36 |
| 2007/0158479 | A1 | * | 7/2007 | Westerman | B02C 21/02 241/101.74 |

(Continued)

*Primary Examiner* — Kyle O Logan
(74) *Attorney, Agent, or Firm* — Leydig, Voit & Mayer, Ltd.

(57) ABSTRACT

A material management system and method manages and tracks the progress of excavated material transferred through an excavation site by a conveyer system operating in cooperation with an in-pit crusher and conveyer (IPCC). The material management system distinguishes the material dispensed into the IPCC into identified material batches. To track the identified material batches, the material management system records data regarding the conveyer speed and the conveyer distance associated with the IPCC, as well as possible other data regarding the identified material batches. The material management system processes this to track the indentified material batches along the conveyer route.

17 Claims, 4 Drawing Sheets

(56) References Cited

U.S. PATENT DOCUMENTS

| | | | | |
|---|---|---|---|---|
| 2010/0224537 A1* | 9/2010 | Valerio | ............... | B07C 5/344 |
| | | | | 209/571 |
| 2013/0272829 A1* | 10/2013 | Innes | ............... | G01G 19/08 |
| | | | | 414/399 |
| 2016/0196749 A1* | 7/2016 | Chen | ............... | G08G 1/096716 |
| | | | | 701/2 |
| 2016/0311465 A1 | 10/2016 | Friend et al. | | |

\* cited by examiner

MATERIAL MANAGEMENT SYSTEM AND METHOD FOR AN IN-PIT CRUSHER AND CONVEYER

TECHNICAL FIELD

The present disclosure relates generally to excavation of material from an excavation site utilizing in part an in-pit crusher and conveyer system and, more particularly, to managing and tracking the excavated material transferred through excavation site.

BACKGROUND

Excavating material such as coal, ore, or other minerals from an excavation site, such as an open pit mine, may be accomplished using an excavating machine such as a rope shovel equipped with a digging tool to physically remove material from the ground and to dispense the material to a hauling machine such as a dump truck. The hauling machine transports the material from the excavation site to a processing site while the excavating machine remains in place to continue excavating material. Typically, if the processing site is located at any substantial distance from the excavation site, a plurality of hauling machines may be required to be continuously available as the rope shovel continues excavating. The number of hauling machines necessary depends in part upon their hauling capacity, with the larger capacity hauling machines needing to make fewer trips to maintain pace with the rope shovel. One advantage of utilizing a fleet of independent hauling machines, though, is that it enables tracking and tracing of the material being excavated by the rope shovel. For example, U.S. Publication No. 2013/0272829 ("the '829 publication") describes a method of utilizing sensors and probabilistic data models to track material being hauled about an excavation site by a hauling machine. Furthermore, the individual hauling machines can be directed to different processing sites depending upon the material being excavated.

More recently, excavation sites have begun utilizing in-pit crushing and conveying ("IPCC") systems that operate in cooperation with the excavating machine to excavate and transport material about the site. The IPCC can include a funnel-like hopper to receive material dispensed from the rope shovel and a local processing unit referred to as an in-pit crusher that functions to break-up or pulverize the material for easier handling. To remove the processed material, the IPCC may be operatively associated with one or more conveyers that transports the processed material away from the excavation site to a common hauling point or processing site. Benefits of the IPCC process include reducing the number of required hauling machines and/or the travel distance that the hauling machines must cover to exit the excavation site. However, the advantage of utilizing individual hauling machines to manage handling of the excavated material is reduced. Accordingly, the present disclosure is directed to a system and method for managing excavated material that is processed in part through an IPCC unit.

SUMMARY

The disclosure describes, in one aspect, a material management system for use at an excavation site to track and trace excavated material. The material management system includes a machine controller operatively associated with an excavating machine that has a digging tool for excavating and dispensing material. The machine controller can communicate with a machine transmitter/receiver disposed on the excavating machine to exchange data with the rest of the material management system. The material management system also includes an IPCC controller operatively associated with an in-pit crusher and conveyer (IPCC) and a secondary conveyer system receiving material from the IPCC. The IPCC controller is configured to monitor the operating status of the IPCC and the secondary conveyer system and to communicate that information with an IPCC transmitter/receiver disposed on the IPCC. The material management system further uses an excavation network to communicate with the machine transmitter/receiver and the IPCC transmitter/receiver. The excavation network is configured to distinguish material into indentified material batches and to track the identified material batches on the secondary conveyer system based on a dispensing time, a conveyer speed, and a conveyer distance.

In another aspect, the disclosure describes a method of managing the excavation of material at an excavation site with an excavating machine. The excavating machine dispenses material into the hopper of an IPCC while recording a dispensing time that material is dispensed. The method distinguishes the dispensed material into individual identified material batches based on the dispensing time. The individual material batches are discharged from the IPCC to a secondary conveyer system operatively associated with the IPCC. A conveyer speed and a conveyer distance associated with the secondary conveyer system are recorded and used to track the identified material batches on secondary conveyer system.

In yet another aspect, the disclosure describes a material management system for excavation in cooperation with an excavating machine dispensing material to an in-pit crusher and conveyer (IPCC) operatively associated with as secondary conveyer system. The material management system is configured to manage and track material on the secondary conveyer system by conducting a process that includes recording a dispensing time when material is dispensed from the excavating machine to the IPCC and recording a conveyer distance regarding the secondary conveyer. The material management system receives a conveyer speed operatively associated with the secondary conveyer and can process the dispensing time, conveyer distance, and conveyer speed to track progress of material on the secondary conveyer system.

DETAILED DESCRIPTION

Figure 1:
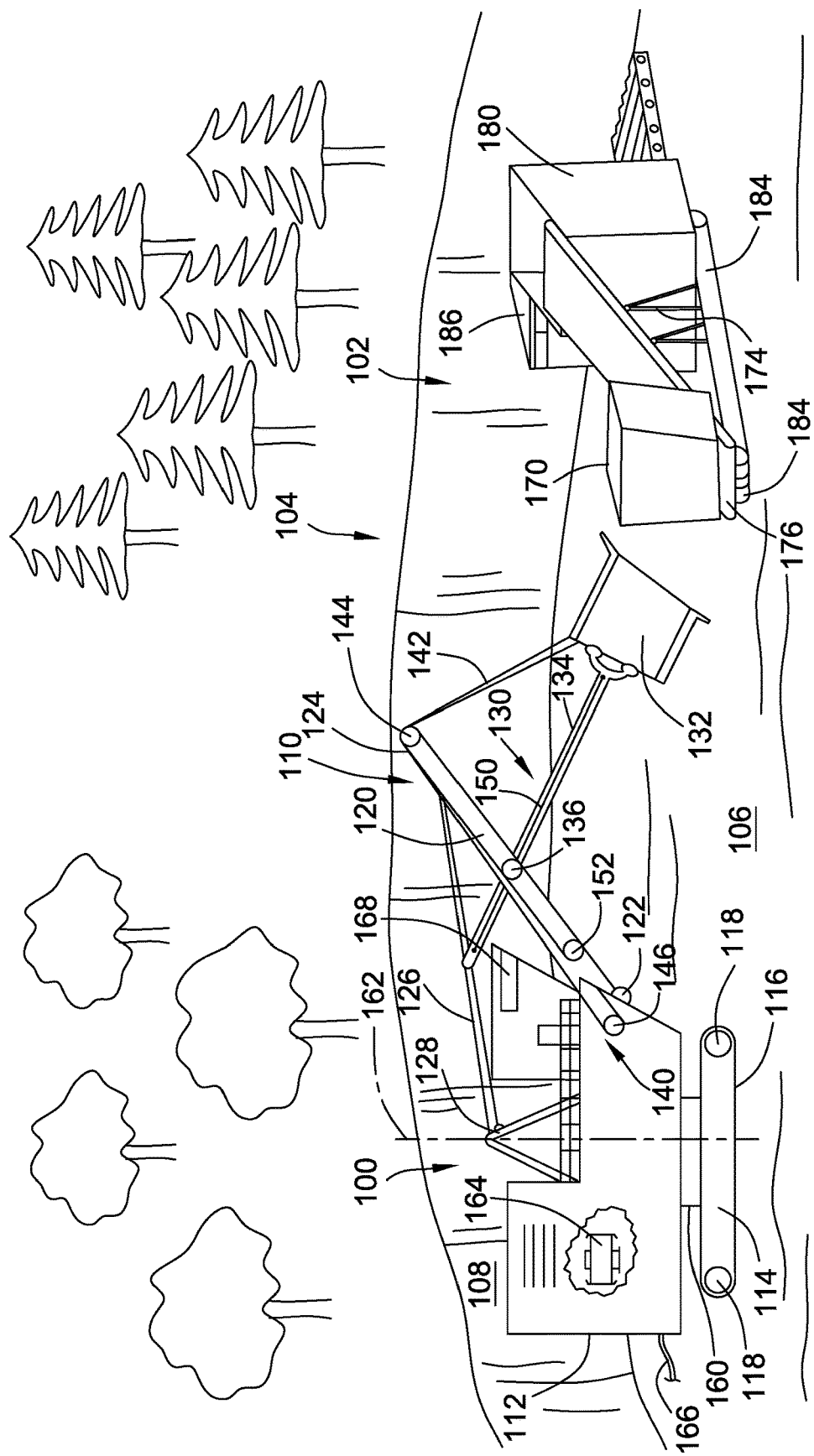
FIG. 1 is a perspective view of an excavation operation at an excavation site utilizing an excavating machine to excavate and dispense material to an IPCC unit that processes the material for ease of handling.

Now referring to the figures, wherein like reference numbers refer to like elements, there is illustrated in FIG. 1 an excavating machine 100 operating in cooperation with a in-pit crusher and conveyer ("IPCC") system 102 to excavate material from an excavation site 104. An excavation site 104 in accordance with the present disclosure may be a large scale, open cast or open-pit mine in which overburden is removed or stripped from the surface of the ground by the excavating machine 100 to access the material of interest, which may be coal, ore, or minerals. Excavation results in the planar or horizontal pit floor 106 being continuously lowered while the excavation site 104 is expanded by operation of the excavating machine 100 to remove material from a vertical bank or pit wall 108 that rises from the pit floor 106. In addition to mining, the excavation site 104 may be intended to create cannels, reservoirs, or other large scale civil engineering projects.

For excavation on the scale of the present disclosure, the excavating machine 100 may be a mining shovel such as a rope shovel or power shovel that removes material from the excavation site 104 by digging into the pit wall 108 to loosen and remove material from the vertical bank. To dig or crowd into the pit wall 108, the excavating machine 100 can include a digging tool 110 that is pivotally and slidably supported on an upper structure 112 that in turn is supported on and carried by an undercarriage 114. To mobilize the excavating machine 100 and propel it about the excavation site 104, the undercarriage 114 can include traction devices such as continuous tracks 116 that are disposed on each side of the excavating machine 100. The continuous tracks 116 form a closed loop or belt disposed around one or more drive wheels or drive sprockets 118 that are rotatably attached to the undercarriage 114 at fixed locations. Rotation of the drive sprockets 118 cause the continuous tracks 116 to translate with respect to the undercarriage 114 thereby propelling the excavating machine 100 over the pit floor 106 in the forward or reverse directions, or they can turn the excavating machine 100 toward the sides. In other embodiments, however, other traction devices can be utilized to propel the excavating machine 100 about the excavation site 104 such as rotating wheels. Furthermore, in addition to the illustrated rope shovel, other examples of mobile excavating machines 100 include draglines, excavators, wheel or track loaders, hoes and the like. In addition, the excavating machine 100 can be stationary in configuration by omission of the continuous tracks 116.

The digging tool 110 can include a boom 120, which may be an elongated, beam-like structure pivotally connected at its proximate lower end 122 to the upper structure 112 and that extends upwardly to a distal upper end 124. The boom 120 may project forward of the excavating machine 100 by extending at an angle of, for example, 60° with respect to the upper structure 112. To support the boom 120 at its upright, angled orientation, one or more suspension ropes 126 can be attached proximate the distal upper end 124 and extend down to an A-frame shaped backstay 128 disposed on the upper structure 112. To penetrate into and remove material from the vertical pit wall 108, the boom 120 can support a dipper assembly 130 that includes a bucket-like dipper 132 disposed at the distal end of an elongated dipper arm 134. The dipper arm 134 is pivotally supported and can slide with respect to the upright boom 120 by operation of a saddle block 136 disposed approximately midway between the proximate lower end 122 and the distal upper end 124. During a digging operation, the dipper assembly 130 is swung upwardly with respect to the pit wall 108 while being projected or forced forwardly into the pit wall 108 so that material is dislodged and collected into the dipper 132 which may have a predetermined capacity or volume for holding material. To enable the dipper assembly 130 to translate with respect to the boom 120, the saddle block 136 can be configured as a sleeve or cradle that supports and interacts with the dipper arm 134 via bearings, rollers, or the like. The process of extending and penetrating the dipper assembly 130 into the pit wall 108 to remove material may be referred to as crowding. To dispense material from the dipper assembly 130, the bottom of the bucket-like dipper 132 can be released allowing the material to fall out.

To cause the relative motion between the dipper assembly 130 and the boom 120, the excavating machine 100 can include a hoist system 140 disposed on the upper structure 112 that includes various motors, actuators, and rigging for operation. For example, to hoist or lower the dipper 132 in the vertical direction, the hoist system 140 can include hoist cables or hoist ropes 142 that are attached to the rear of the dipper 132 and that extend upwardly around a sheave 144 or pulley disposed at the distal upper end 124 of the boom 120. The hoist ropes 142 partially wrap around the sheave 144 to reverse direction and extend back downwards generally parallel to the boom 120 to wrap around a hoist wench 146 disposed in the upper structure 112. The hoist wench 146 may be operatively coupled to a motor to selectively rotate to wind in or pay out the hoist ropes 142. Winding in the hoist ropes 142 can pivot the dipper assembly 130 upwardly with respect to the boom 120 while paying out the hoist ropes 142 can lower the dipper assembly 130 with respect to the boom 120. In addition, the dipper assembly 130 can be operatively associated with one or more crowd ropes 150 that are attached proximate to the respective ends of the dipper arm 134 and that wrap around the saddle block 136 to extend down to a crowd wench 152 rotatably disposed on the boom 120. The crowd wench 152 can rotate to pay out or take in the crowd ropes 150 in a manner that causes the dipper arm 134 to slidably translate with respect to the boom 120 by operation of the saddle block 136. Sequential action of the hoisting and crowding motions with respect to the pit wall 108 crowds the dipper assembly 130 into the pit wall 108 dislodging material and filling the dipper 132. While the foregoing description of the digging tool 110 relates to a rope-operated configuration, it will be appreciated that in other embodiments, the digging tool 110 may be operated by other methods or processes.

To move the dislodged material away from the pit wall 108, the upper structure 112 can swing or rotate with respect to the undercarriage 114. For example, the upper structure 112 and the undercarriage 114 may be operatively connected through a rotatable turntable or swing platform 160 that can swing the upper structure 112 about a swing axis 162 that extends vertically through the excavating machine 100. To provide power for the hoist system 140, hoist and crowd wenches 146, 152, and the continuous tracks 116, the excavating machine 100 includes an electrical system 164 that receives three-phase electrical power through a trail cable 166 from an off-board electrical source and that distributes power to the various components. In alternative embodiments, however, the excavating machine may include an on-board prime mover such as an internal combustion engine that combusts hydrocarbon-based fuel to generate mechanical power. To accommodate an operator and the various controls, gauges, and interfaces for operating the excavating machine 100, an operator's station 168 can be disposed on the upper structure 112 in a location that provides a view towards the digging tool 110.

The in-pit crusher and conveyer ("IPCC") system 102 operates in cooperation with the excavating machine 100 to process and transfer the material excavated from the pit wall 108. To receive the material dispensed from the excavating machine 100, the IPCC 102 can include a hopper 170 that is supported on an IPCC frame 174. The hopper 170 can be configured as funnel-like structure that receives material through its opened top end and that tappers inwardly towards its bottom end to direct the material to first conveyer 176 disposed underneath the hopper 170. The conveyer 176 can be a flexible, closed belt that extends around and is supported by conveyer pulleys that cause the conveyer to translate with respect to the hopper 170. To pulverize the deposited material, the conveyer 176 can extend at an upward angle to direct material toward the top of a material processing device 180 located behind the hopper 170. The conveyer 176 thereby drops the excavated material into the opened top of the material processing device 180 for processing the material by grinding or breaking it up into smaller particulates or aggregate for easier handling. To break up the material, the material processing device 180 can include internal gears, teeth or blades that interact to shred or masticate the deposited material that is then dispensed from the lower end. The material processing device 180 can further include vibrators and the like to assist in processing the material. After processing, the material may be ground or crushed into a finer grade of aggregate for easier handling and transfer.

In an embodiment, the IPCC 102 can be configured to independently move about the excavation site 104, for example, to follow the excavating machine 100 as the pit wall 108 shifts in location to continue the excavation process. In particular, the IPCC frame 174 can be supported on another plurality of continuous tracks 184 that contact and can be made to translate with respect to the pit floor 106. However, in other embodiments, the IPCC 102 may be stationary and require another device to move it about the excavation site 104. In a further embodiment, to accommodate an operator and various controls and input devices for configuring and operating the IPCC 102, an onboard operator's station 186 in the form of an indoor cab may be disposed on and carried by the IPCC frame 174. The controls and inputs can enable adjustment of the characteristics of the IPCC such as processing rate, pulverization grade, and the like. However, in other embodiments the operator's station 186 can be a basic input panel disposed at an accessible location on the IPCC frame 174.

Figure 2:
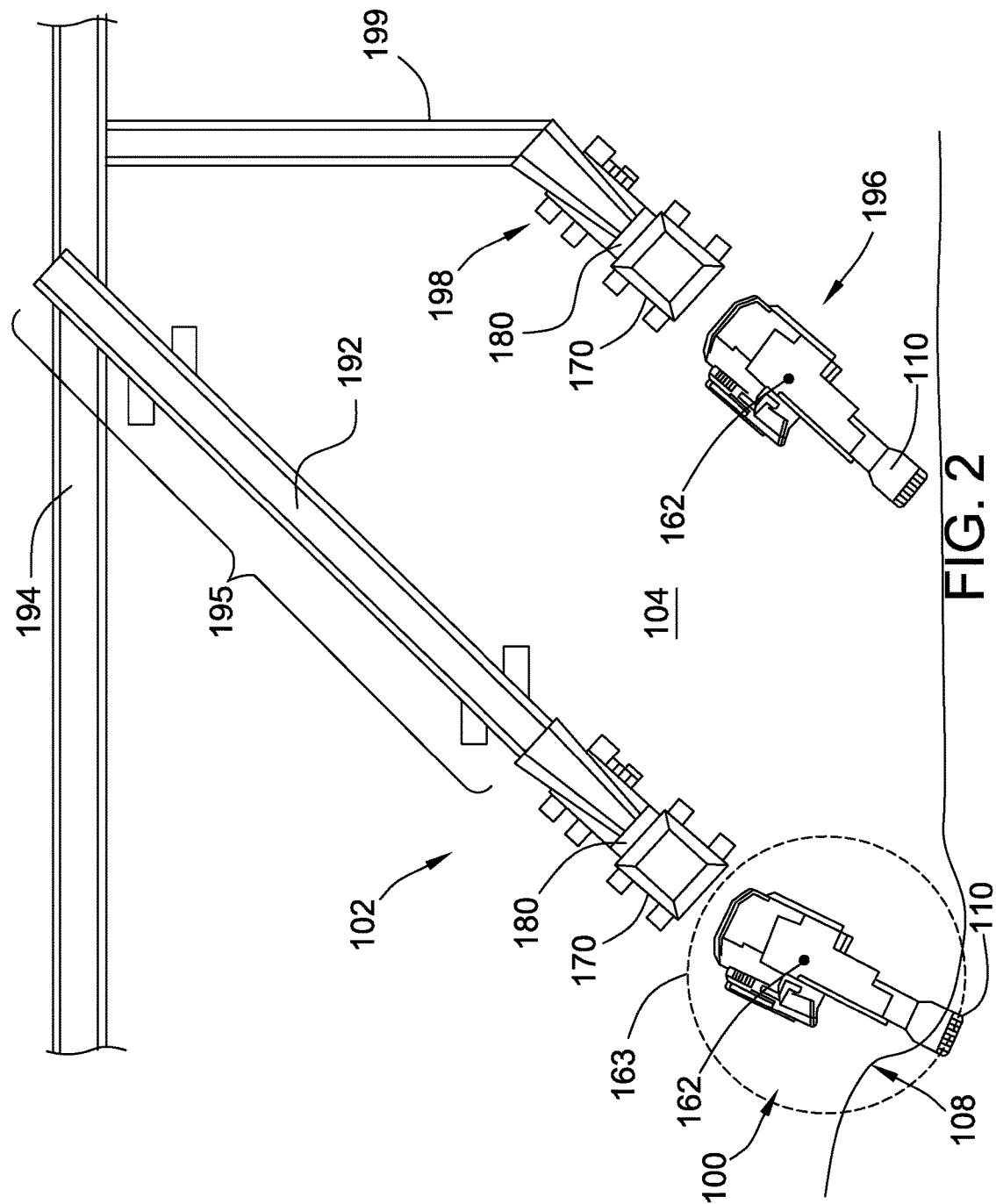
FIG. 2 is a top plan schematic representation of the excavating machine and the IPCC unit arranged with respect to a secondary conveyer system that transports the processed material.

Referring to FIG. 2, the excavation process utilizing the excavating machine 100 and the IPCC 102 is illustrated. The excavating machine 100 is initially oriented toward the pit wall 108 extending along the excavation site 104 with the digging tool 110 directed toward the pit wall 108 and the IPCC 102 located generally behind the excavating machine 100. In this initial orientation, the digging tool 110 can be crowded into the pit wall 108 to dislodge and collect material. Because the excavating machine 100 can pivot or rotate with respect to the pit wall 108, the excavating machine 100 is associated with a swing radius 163 that is defined by the distance the digging tool 110 extends outwardly with respect to the swing axis 162. The IPCC 102 is preferably located within the swing radius 163 so the excavating machine 100 can swing the digging tool 110 away from the pit wall 100 over the hopper 170 to dispense the collected material therein. The hopper 170 can direct the dispensed material to the material processing device 180 that processes the material as described above while the excavating machine 100 can swing the digging tool 110 back toward the pit wall 108 to dislodge and remove more material.

To direct the processed material away from the excavation site 104, the IPCC 102 can be operatively associated with a secondary conveyer system 190. In the illustrated embodiment, the secondary conveyer system 190 can include an intermediate conveyer 192 receiving the discharged material from the IPCC 102 and a main conveyer 194 disposed in and leading from the excavation site 104. The main conveyer 194 can be generally fixed in location while the intermediate conveyer 192 is relatively more mobile so it can be adjusted and extended to follow proximately with the excavating machine 100 and the IPCC 102. The intermediate conveyer 192 may start at one end proximate to the IPCC 102 to receive processed material and terminates at the main conveyer 194 onto which it passes the processed material. The intermediate conveyer therefore extends over a conveyer span or conveyer distance 195 within the excavation site 104. The intermediate and main conveyers 192, 194 can be of a closed loop construction and include closed belts, slide plates, or trays, and can be straight in alignment or can include various suitable bends or turns. In an embodiment, the intermediate conveyer 190 can be made of a plurality of joined sections that enables new sections to be inserted to increase its length as the IPCC 102 moves about the excavation site 104. In another embodiment, the intermediate conveyer 192 can be a telescoping conveyer having extendable and retractable sections for selectively adjusting its length. In addition, the secondary conveyer system 190 can be configured to elevate the processed material from the pit floor 106 out of the excavation site 104 to a location where the material may be more accessible.

In the illustrated embodiment, to increase productivity, a second excavating machine 196 operating in conjunction with a second IPCC 198 can be included in the excavation site 100. The second excavating machine 196 and second IPCC 198 can have the same construction or a different design from the first excavating machine 100 and the first IPCC 102. In addition, to direct material from the second IPCC 198 away from the excavation site 104, the second IPCC 198 can be operatively associated with second intermediate conveyer 199 that extends to and passes material to the main conveyer 194. The second intermediate conveyer 199 can have the same construction as the first intermediate conveyer 192 and can extend for any suitable distance. It should be appreciated that in addition to the second IPCC 198 and the second intermediate conveyer 199, any additional number of IPCCs and conveyers can be included at the excavation site 104 to increase productivity.

Figure 3:
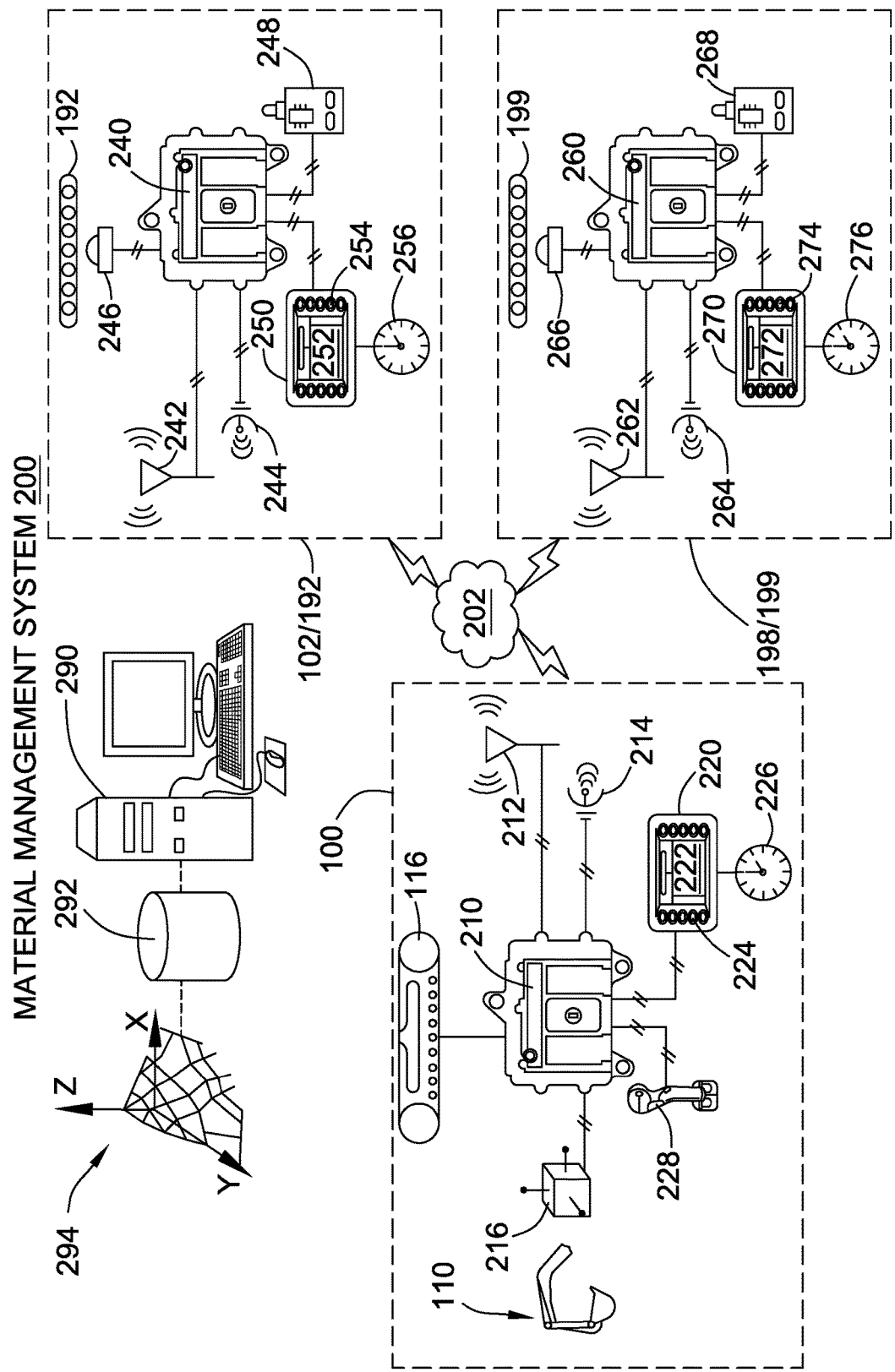
FIG. 3 is a schematic representation of the sensors, communication devices, and logical devices that are operatively associated with the excavating machine, the IPCC, and the secondary conveyer system to track and manage the excavated material it is transferred through the excavation site.

In the present embodiment, to manage and track the transfer of excavated material about the excavation site 104, the first excavating machines 100 and the first IPCC 102 with its associated secondary conveyer system 190 can be operatively arranged to communicate and cooperate with each other. Referring to FIG. 3, to direct the cooperative interaction between the first excavating machine 100, first IPCC 102, and secondary conveyer system 190, the first excavating machine 100 and the first IPCC 102 can be operatively associated with a computerized or electronic material management system 200 that is configured to coordinate, control, and guide cooperative operation of the devices to mange and track material. The material management system 200 can be physically embodied as a communications network or computerized excavation network 202 that interconnects and establishes communication to exchange data and information between the first excavating machine 100, the first IPCC 102, and the secondary conveyer system associated with the first IPCC; although in specific embodiments, the material management system 200 may reside with, or be more particularly associated with, a specific component.

For example, to establish interaction between the first excavating machine 100 and the excavation network 202 in a manner that maintains the material management system 200 for execution, the first excavating machine 100 can include an electronically actuated machine controller 210 onboard that is able to execute and process various software instructions, programs, functions, steps, routines, tasks and processes. The machine controller 210 can be embodied as a microprocessor, an application specific integrated circuit ("ASIC"), or other appropriate circuitry and may have computer readable and writable memory or other data storage capabilities. The computer readable and writable memory can include any suitable type of electronic memory devices such as random access memory ("RAM"), read only memory ("ROM"), dynamic random access memory ("DRAM"), flash memory and the like. The computer readable and writable memory may store data and applications such as data tables, charts, maps, and the like saved in and executable from the memory or another electronically accessible storage medium to assist in operation of the excavating machine 100. The machine controller 210 may be responsible for controlling operation of other components of the excavating machine or may be integrated with other control devices through, for example, a CAN bus associated with the excavating machine. Although in the schematic representation of FIG. 3, the machine controller 210 is represented as a single, discrete unit, in other embodiments, the machine controller 210 and its functions may be distributed among a plurality of distinct and separate components associated with the first excavating machine 100.

To enable the machine controller 210 to send, receive, and process data about the excavation process via the excavation network 202, the machine controller 210 can be operatively associated with any of various sensors, communication devices, and other logical or electronic components. For example, to establish communication with the IPCC 102 and/or the excavation network 202, a mobile machine communications device that can be in the form of a machine receiver/transmitter 212 can be disposed on the first excavating machine 100 and is configured to send and receive electronic signals that may be in digital or analog format. The machine receiver/transmitter 212 can include an antenna to receive and emit signals such as radio frequency waves. In other embodiments, the machine receiver/transmitter 212 can communicate through other wireless technologies such as infrared, Bluetooth, optical recognition, and the like. Furthermore, in other embodiments, the machine receiver/transmitter 212 can be configured for wired communication by sending and receiving electrical, optical, or other forms of signals over communications wires, busses, or fiber optics. While the present embodiment of the machine receiver/transmitter 212 can send and receive signals, in other embodiments the machine receiver/transmitter 212 may be limited to either receiving or transmitting, and the term "receiver/transmitter" should be interpreted in both the conjunctive and disjunctive sense. The machine receiver/transmitter 212 and the machine controller 210 can include or be associated with circuitry or like to convert or interpret the sent or received signals into data and information that can be electronically or digitally processed to facilitate operation of the excavating machine 100.

To provide information about the location or position of the first excavating machine 100 with respect to the excavation site 104, the machine controller 210 can also be operatively associated with a positioning device or machine position sensor 214. The machine position sensor 214 can recognize or determine the relative position of the first excavating machine 100 with respect to other units disposed about the excavation site and can relay the machine position data to the guidance system 200 via the machine controller 210 and the machine transmitter/receiver 212. For example, the machine position sensor 214 can operate on a global navigation satellite system ("GNSS") whereby the machine position data associated with the first excavating machine 100 is triangulated from received satellite signals. However, in other embodiments, the machine position sensor 214 can operate based on other technologies such as ground-based systems using pseudolites, visual perception such as LIDAR, stereo, camera, Radar, range radios, and the like.

In an embodiment, the machine position sensor 214 may be associated with a particular part or component of the first excavating machine 100 such as, for example, the digging tool 110 to provide precise machine position data with respect to that particular component. In another embodiment, the first excavating machine 100 can be equipped with one or more kinematic sensors 216 that monitor and sense positional and operational information regarding the excavating machine 100 including the digging tool 110. For example, the kinematic sensors 216 can measure the swing position or swing angle of the digging tool 110 with respect to the swing axis 162 of the excavating machine 100 or can measure the extension of the digging tool 110 with respect to the excavating machine 100. The machine controller 210 can use the information from the kinematic sensors 216 to determine more precisely the position and movement of the digging tool 110 at a given time and can communicate that information to the excavation network 202 via the machine transmitter/receiver 214. Hence, the machine position data may reflect the precise location of the digging tool as it engages, dislodges, and gathers material from the excavation site 104.

To interface or interact with an operator of the first excavating machine 100, the machine controller 210 can be operatively associated with an electronic user interface 220. The electronic user interface 220 may be disposed at an accessible location in the operator's station 168 onboard of the excavating machine 100, although in other embodiments, it may be an off board, handheld device configured to remotely operate the first excavating machine 100. The electronic user interface 220 can include various components to interface with the operator such as a display screen 222, which may be a liquid crystal display with touch screen capabilities. The electronic user interface 220 may also include various dials, switches, or buttons 224 through which commands may be entered. To record or log actions or events occurring with operation of the first excavating machine 100, the electronic user interface 220 can include a clock 226 that can measure time intervals or instances in digital or analog format.

In an embodiment, to integrate the machine controller 210 with operation of the first excavating machine 100, the machine controller 210 can be operatively associated with the components used to physically direct operation of the first excavating machine 100. For example, the machine controller 210 can be in communication with one or more input devices 228 such as joysticks, steering wheels, gear selectors, pedals, and the like by which the operator directs movement and operation of the first excavating machine 100. Accordingly, the machine controller 210 receives current information indicating the task or operation the first excavating machine is being directed to perform. In a further embodiment, the machine controller 210 may also be operatively associated with the continuous tracks 116 or other traction or propulsion devices included with the first excavating machine 100.

To integrate the first IPCC 102 and the associated secondary conveyer system 190 with the excavation network 202, those components may also include various electronic or logical devices, sensors, and controls. In various embodiments, those components may be included on the first IPCC 102, the first intermediate conveyer 194 associated with the first IPCC 102, or may be distributed between both. For example, a first IPCC controller 240 can be disposed on the first IPCC 102 itself and can be operatively associated with the first intermediate conveyer 194. The first IPCC controller 240 may have a similar construction, architecture, and/or functionality as to the machine controller 210 to execute various software instructions, programs, routines, functions, processes and the like. To enable communication with the excavation network 202, the first IPCC controller 240 can be operatively associated with a communication device that may also be embodied as a first IPCC transmitter/receiver 242 that can send and receive radio frequency signals or other communication signals. To assess or determine the location of the first IPCC 102 with respect to the excavation site 104, the first IPCC controller 240 can communicate with a first IPCC location sensor 244. The first IPCC location sensor 244 can also operate on global navigation satellite positioning ("GNSS") technology or any other suitable positioning technology and can provide updated information regarding the position of the first IPCC 102 especially if it relocates with respect to pit walls 108 within the excavation site 104.

To track the material received by the first IPCC 102 from the first excavating machine 100, the first IPCC 102 controller can be in communication with a first speed sensor 246 that measures the travel speed of the first intermediate conveyer 192. Specifically, the first speed sensor 246 can measure the speed at which the conveyer belt, or the pulleys and sprockets responsible for translating the conveyer belt, translates with respect to the first IPCC 102 to determine the speed the first intermediate conveyer 192 is moving material from the first IPCC 102 about the excavation site 104. The first speed sensor 246 can be configured as a frictional roller sensor in rolling contact with some moving part of the first intermediate conveyer 192, a magnetic pickup sensor sensing the strength of a magnet moving thereby, an optical sensor, or can have any other suitable configuration and can output the conveyer speed in meters-per-minute (mpm), miles per hours (mph), or any other suitable unit.

In addition to the first speed sensor 246, the first IPCC controller 240 can be operatively associated with one or more first IPCC sensors 248 to measure other parameters, characteristics, and settings of the first IPCC 102 and/or the first intermediate conveyer 192, such as the weight or volume of material being processed and transferred, or the granularity of the material after processing. To interface with an operator, the first IPCC controller 240 can communicate with an electronic user interface 250 that also includes a display device 252 such as an LCD screen and one or more dials, switches, and buttons 254 to interact with the operator. The dials, switch, and buttons 254 may allow an operator to input operational commands, such as setting the conveyer speed for the first intermediate conveyer 192 or setting the processing rate of the first IPCC 102. In an embodiment, the first IPCC sensor 248 and/or the electronic user interface 250 can determine or receive the present length or distance of the first intermediate conveyer 192 which maybe update if the conveyer distance changes. To record time intervals or instances that may be associated with various actions undertaken by the first IPCC 102, the first IPCC controller 240 can be associated with a first IPCC clock 256 that may be displayed on the display device 252.

In the embodiments in which a second IPCC 198 and a second intermediate conveyer 199 are included at the excavation site 104, the second IPCC 198 can be operatively associated with a second IPCC controller 260 that may have the same or similar architectural configuration as the first IPCC controller 240. Specifically, the second IPCC controller 260 can include a communication device configured as a second IPCC receiver/transmitter 262 to exchange communication signal with the excavation network 202. To determine the relative location of the second IPCC 198 with respect to excavation site 104 and other units thereabout, a second IPCC location sensor 264 can be included with the second IPCC 198 to receive and triangulate satellite signals or can utilize other positioning technologies. The second IPCC controller 260 can also measure the speed of the second intermediate conveyer 199 or another conveyer associated with the second 198 IPCC using a second speed sensor 266. To measure or sense other characteristics, parameters, and setting of the second IPCC 198 and/or the associated second intermediate conveyer 199, a second IPCC sensor 268 can be operatively associated with the second IPCC controller 260.

To interface with an operator, the second IPCC controller 260 can also be operatively associated with a second electronic user interface 270 that can include a second display device 272 and one or more dials, switches, and buttons 274 for inputting commands and settings such as conveyer speed, processing rate or setting the conveyer distance of the second intermediate conveyer 199. The second electronic user interface 270 can also include a second clock 276 that enables the second IPCC controller 260 to record temporal events or actions occurring with respect to the second IPCC 198 or the associated second intermediate conveyer 199. It should be appreciated that in embodiments where additional excavating machines, IPCCs, and conveyers are present at the excavation site, they may be similarly configured with electronic and logical devices and sensors to communicate and interact with the excavation network 202.

To integrate and administer the material management system 200, the excavation network 202 can also be communicatively linked with a base station 290 that may be physically present at the excavation site 104 and can include various computer systems and peripheral devices for functionally executing various networking management tasks. For example, the base station can electronically store comprehensive excavation site data 292 such as terrain data, excavation plans, material locations and the like. The excavation site data 292 may stored in an electronically readable format in a database or the like at the excavation base station 290 and can be transmitted and supplemented by data exchanges over the excavation network 202. In an embodiment, the excavation site data 292 can include information from topographic or terrain excavation maps 294 regarding the location, by coordinates or otherwise, of the different types of material present at the excavation site 104. For example, the excavation maps 294 can identify the locations of coal, ore or mineral deposits at the excavation site 104 or can indicate if a certain location consists primarily of overburden. The excavation maps 294 can be three-dimensional to reflect the depth of the different materials at a particular location. Information for the excavation maps 294 can be gathered by pre-excavation scouting and exploration of the excavation site 104. The base station 290 can also receive, store, and exchange data signals and electronic information between the excavating machine 100, the first and second IPCCs 102, 198, and other devices connected through the excavation network 202. In addition, the base station 290 and the logic devices located thereat can be operatively associated with suitable inputs and interfaces to enable operators to interact with the excavation network 202, for example, by updating or monitoring excavation site data 292. In an alternative embodiment, the excavation network 202 may be decentralized and operate on a peer-to-peer network architecture.

INDUSTRIAL APPLICABILITY

Figure 4:
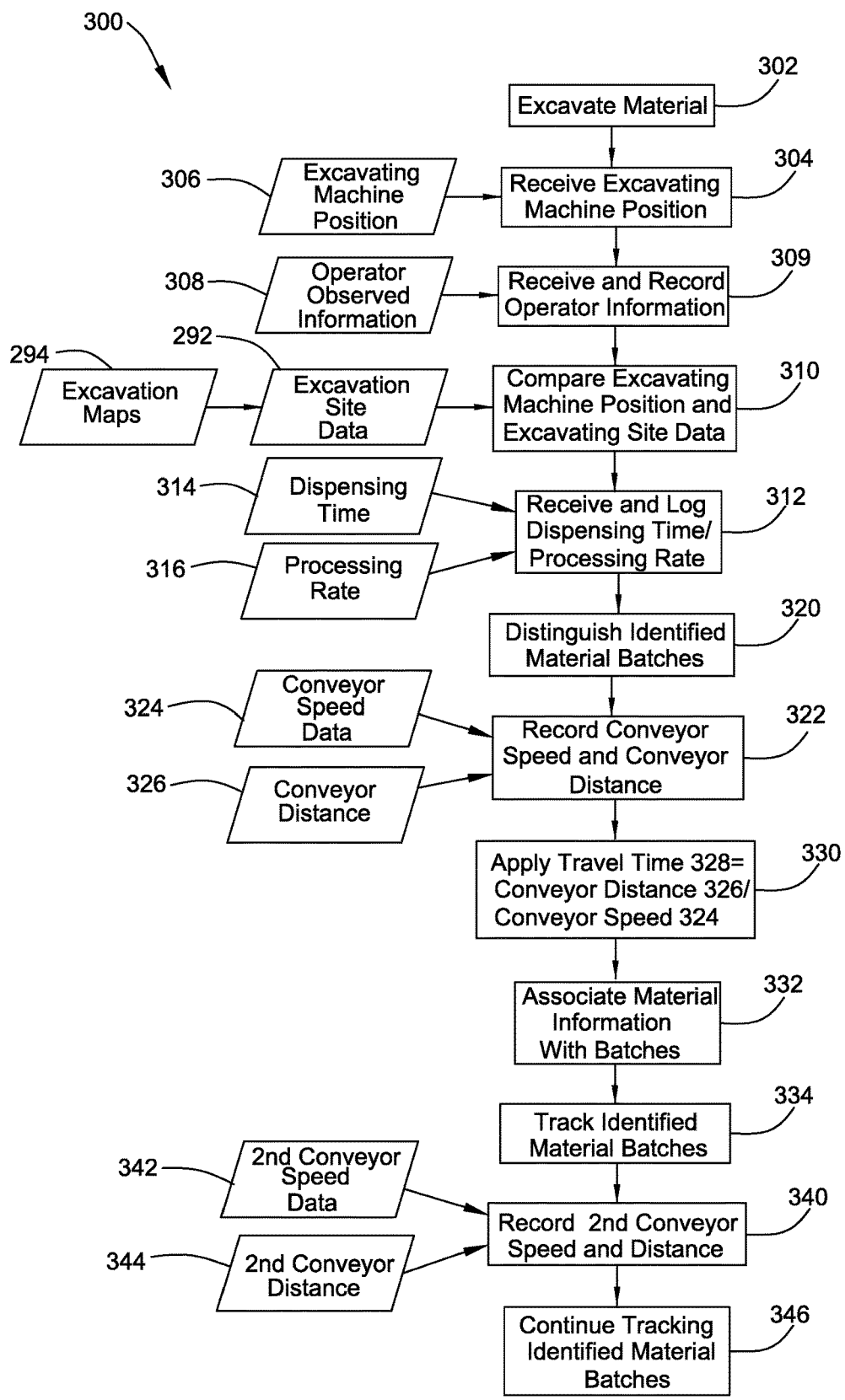
FIG. 4 is a logic diagram or flowchart representing a possible process for managing and tracking the excavated material as it is transferred through the excavation site.

The foregoing material management system 200 can be used to track and manage the progress or transfer of excavated material through the excavation site 104 and more specifically to associate and record information regarding distinguishable batches of excavated material. Referring to FIG. 4, there is an illustrated embodiment of a process 300 or series of processes for executing the material management system 300, which can be embodied as software including instructions and commands written in computer-executable programming code. In accordance with the disclosure and with reference to FIGS. 2, 3, and 4, the process 300 can start with a material removal step 302 in which the excavating machine digs and removes material from the excavation site 104 with the digging tool 110.

To determine the specific location at the excavating site where the material is removed from, the process 300 in a receive position step 304 can receive excavating machine position data 306 associated with the location of the excavating machine and preferably with the location of the digging tool 110 as it engages material. Specifically, the machine position sensor 214 can monitor and generate the machine position data 306 that can be transmitted to the material management system 200 via the machine receiver/transmitter 212 over the excavation network 202. The excavating machine position data 306 may be measured in coordinates such as longitude or latitude or by another suitable designation and may reflect the kinematic motions of the digging tool during a digging operation. In an optional embodiment, the process 300 associated with the material management system 200 can also include a step of receiving and recording operator observed information 308 transmitted from the machine receiver/transmitter 212 disposed on the excavating machine 100. Operator observed information 308 can include any noted observations about the quality or characteristic of the material made by the operator of the excavating machine 100 at the time of digging, which can be input through the electronic user interface 220 on the excavating machine 100 and, in a receiving and recording step 309, can be received and recorded by the material management system 200 for subsequent use.

To assess other characteristics or aspects associated with the excavated material, the process 300 in a comparison step 310 can compare the machine position data 306 with excavation site data 292 that can be received from the base station 290. The excavation site data 292 may include the excavation maps 294, which may have information associating specific locations about the excavation site 104 with various characteristics or attributes of the excavated material. This data may include the grade or type of the material at the material removal position, such as identifying the material as ore, mineral, coal, or overburden, which may be known through pre-excavation exploration. Other information may include material consistency, volume percentages, or impurities.

To associate the excavating machine position data 306 and any retrieved excavation site data 292 with the material, the process 300 in a data reception step 312 can receive and record a dispensing time 314 and/or processing rate 316 transmitted from the excavating machine 100 or the first IPCC 102 respectively. The dispensing time 314 may reflect the relevant time the excavating machine 100 dispenses material from the digging tool 110 to the hopper 170 of the first IPCC 102 and the processing rate 316 may reflect how quickly the first IPCC 102 processes and discharges material to the first intermediate conveyer 192.

In a material identification step 320, the process 300 can use the dispensing time 314 and the processing rate 316 to distinguish the processed material into identified material batches. In a specific embodiment, the material identification step 320 can associate the time the material enters and/or is discharged from the first IPCC to distinguish individual and distinct batches of material that are deposited on the first intermediate conveyer 192. The identified material batches can be further associated with a unique identification number or the like to enable the material management system 200 to continuously track the identified material batches during transfers through the excavation site 104. It can be appreciated the quantity of material in each identified material batch may correspond to the capacity of the digging tool for each dig or scoop, although in other embodiments the quantities may differ.

After the process 300 has distinguished the material discharged from the IPCC 102 into identified material batches, the material management system 200 in a data association step 322 can associate data about material information with the individual identified material batches. For example, the material information may include the location or position where the material in the identified material batches was obtained from the excavation site, which can be determined from the excavating machine position data 306 and which can be provided in longitude, latitude, and depth. Also, from the comparison step 310 and the excavation site data 292, the association step 322 can associate material information such as material type, material grade, and other material information gathered by the material management system 200. Also, based on the known volume of the dipper, or if the IPCC sensor is configured to measure mass or granularity, the association step 322 can associate material information regarding mass, volume, or granularity data with the individual identified material batches. Processing conditions occurring in the IPCC may also be assigned to the identified material batches. The granularity of the material information can be maintained to the level of individual loads or dispensed volumes from the excavating machine 100.

To continue tracking the identified material batches after they have been distinguished and begin being conveyed along the first intermediate conveyer 192, the process 300 in another data recordation step 324 can receive and record conveyer speed data 326 and conveyer distance 328 reflecting the distance or length of the intermediate conveyer 192. The conveyer speed data 326 can be determined by the speed sensor 246 associated with the first IPCC 102 and the conveyer distance 328 can be input through electronic user interface 250 or otherwise recorded at, for example, the base station 290. The conveyer speed data 326 and the conveyer distance data 328 are related to the travel time of the indentified material batches on the intermediate conveyer 192 according to the following equation:

$$\text{Travel Time } 328 = \text{Conveyer Distance } 328/\text{Conveyer speed } 326 \qquad (\text{Eqn 1.})$$

Accordingly, by applying Eqn. 1 in an application step 330, the process 300 can track the progress of the identified material batches along the conveyer route in a tracking step 332. Furthermore, the material management system 200 can determine when the identified material batches will be discharged at the end of the intermediate conveyer 192, for example, onto another conveyer such as the main conveyer 194. In the event the identified material batches are discharge to main conveyer 194, the process 300 in another data recordation step 340 can receive additional data regarding conveyer speed 342 and conveyer distance 344 associated with the main conveyer 194. Accordingly, the material management system 200 may in continued tracking step 346 utilize Eqn. 1 to continue tracking and tracing the identified material batches along the main conveyer 194 to an extraction point or processing site where the material exits the excavation site 104.

Hence, by using Eqn. 1 and recording the relevant travel times, the material management system 200 can track and trace the identified batches moving through the secondary conveyer system 190 without the use of technologies such as RFID or barcodes. The material management system 200 can further determine when the distinct identified material batches will exit the excavation site 104. Further, the excavating machine position data 306 regarding the excavation location, any operator observed information 308, and any relevant excavation site data 292 remains associated with the individually indentified material batches and can be used for sorting or further processing the excavated material. It will be appreciated that the process 300 can be applied in the embodiments that include a second IPCC 198 and second intermediate conveyer 199 to individually distinguish and track identified material batches from those units as well. Further, the material management system 200 can facilitate operation of the plurality of conveyers about the excavation site 104, for example, by speeding up or slowing down select conveyers to prevent the identified material batches from becoming commingled and losing the data associations.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A material management system for use at an excavation site comprising:
    a machine controller operatively associated with an excavating machine having a digging tool for excavating and dispensing material, the machine controller communicating with a machine transmitter/receiver disposed on the excavating machine;
    an IPCC controller operatively associated with an in-pit crusher and conveyer (IPCC) and a secondary conveyer system receiving material from the IPCC, the IPCC controller configured to monitor operating status of the IPCC and the secondary conveyer system and to communicate with a IPCC transmitter/receiver disposed on the IPCC; and
    an excavation network in communication with the machine transmitter/receiver and the IPCC transmitter/receiver, the excavation network configured to distinguish material into indentified material batches and to track the identified material batches on the secondary conveyer system based on a dispensing time, a conveyer speed, and a conveyer distance.

2. The material management system of claim 1, wherein the excavating machine further includes a machine position sensor to determine an excavating machine position with respect to the excavation site.

3. The material management system of claim 2, wherein the excavation network further compares the excavating machine position to excavation site data to determine material associated with the identified material batches.

4. The material management system of claim 3, wherein the material information is selected from the group comprising location data, material type data, material grade data, volume data, and mass data.

5. The material management system of claim 4, wherein the excavating machine position corresponds to a position of a digging tool disposed on the excavating machine.

6. The material management system of claim 1, wherein the identified material batches are individually distinguished based the dispensing time and a processing rate associated with the IPCC.

7. The material management system of claim 1, wherein the identified material batches are tracked on the secondary conveyer system based on the conveyer speed and the conveyer distance.

8. The material management system of claim 1, wherein the secondary conveyer system includes a second conveyer receiving the identified material batches.

9. The material management system of claim 8, wherein the excavation network receives a second conveyer speed and a second conveyer distance associated with the second conveyer, and the identified material batches are tracked on the second conveyer based on the second conveyer speed and the second conveyer distance.

10. The material management system of claim 1, wherein the excavation network receives operator observed information from an operator and associates the operator observed information with the identified material batches.

11. A method of managing material at an excavation site comprising:
    excavating material with an excavating machine;
    dispensing material into the hopper of an IPCC;
    recording a dispensing time that material is dispensed into the hopper of the IPCC;
    distinguishing material into identified material batches based on the dispensing time;
    discharging material from the IPCC to a secondary conveyer system operatively associated with the IPCC;
    recording a conveyer speed and a conveyer distance associated with the secondary conveyer system; and
    tracking the identified material batches based on the conveyer speed and the conveyer distance.

12. The method of claim 11, further comprising associating material information with the identified material batches.

13. The method of claim 12, wherein the material information is selected from the group comprising location data, material type data, material grade data, volume data, and mass data.

14. The method of claim 13, further comprising determining excavating machine position data associated with the excavating machine, and the location data is based on the excavating machine position data.

15. The method of claim 14, wherein the excavating machine position data corresponds to position of a digging tool disposed on the excavating machine.

16. The method of claim 13, further comprising comparing the excavating machine position data with excavation site data, and the material grade data and the material type data are determined based on the excavation site data.

17. The method of claim 11, further comprising associating operator observed data with the identified material batches.

* * * * *